United States Patent Office 3,561,980
Patented Feb. 9, 1971

3,561,980
PROCESS FOR PASTEURIZATION OF WHOLE EGGS
John C. Sourby, Hawthorne, and Willibald F. Kohl, Yonkers, N.Y., and Rudolph H. Ellinger, New Canaan, Conn., assignors to Stauffer Chemical Company, New York, N.Y., a corporation of Delaware
No Drawing. Filed Jan. 2, 1968, Ser. No. 694,831
Int. Cl. A23b 5/00; A23l 3/00
U.S. Cl. 99—161                                    14 Claims

ABSTRACT OF THE DISCLOSURE

A process of pasteurizing liquid whole eggs which consists of separating the eggs from the shells and forming a homogeneous mixture. Then a food grade bivalent metal ion material selected from the group consisting of calcium, zinc and mixtures thereof is dissolved therein. Thereafter an alkali polyphosphate material is added thereto and the mixture is then heated to a pasteurization temperature of 125° to 145° F. for from 0.5 to 10 minutes. In the alternative a food grade alkali agent can be incorporated therein to raise the pH thereof from about 0.5 to 2.5 units above the natural pH of the eggs prior to pasteurization.

BACKGROUND OF THE INVENTION

There are a number of food poisoning microorganisms that cause serious problems in the food industry. Among these different spoilage organisms, which may contaminate foodstuff, the group Salmonellae have gained special importance. Salmonellae are pathogenic gram-negative rod-like bacteria that have drawn much recent attention, that is well documented in the literature. Of the several food areas involved, particular interest has been generated in a reduction of Salmonellae in liquid eggs. The contents of an egg with unbroken shell may already contain bacteria caused by the infection of a laying hen. The exterior surface of the egg may be contaminated with bacteria from the intestinal tract of the hen, from the nest, or other material contacted after laying. Some of these can be introduced into egg products during breaking operations. Bacteria can also penetrate the shell from outside. The invading microorganisms infect the egg and can be carried on into a variety of egg products.

The elimination of Salmonellae by pasteurization of egg products has become mandatory on United States Department of Agriculture regulation. According to these regulations, all egg products have to be pasteurized regardless of whether they are to be distributed in frozen, liquid, or dried form. At present, the common method of pasteurization of the whole egg is to remove the egg from the shell and mix the same together to form a homogeneous mixture of egg white and egg yolk. Thereafter, the liquid whole eggs are heated to a temperature of between 140 and 143° F. for about 3.5 minutes. This procedure has proved to kill Salmonellae embodied within the egg product but Salmonellae may survive and stay within the egg product after pasteurization. Attempts to eliminate the Salmonellae completely within the egg products include the use of a higher temperature for the pasteurization process. However, the high temperatures involved break down proteins within the egg constituents. Precipitation of the proteins or discoloration of the liquid whole eggs results in an unsaleable product.

Thus, all pasteurization processes of eggs must be a compromise between the amount of heat applied to kill Salmonellae and the coagulation of the egg proteins, which effect the functional properties thereof. Although naturally occurring levels of Salmonellae are seldom greater than 100 per milliliter of egg product, present processes have need of improvement to minimize undesirable effects on the functional properties of the egg product, excessive buildup on plant equipment, and lack of retained inhibitory effects after pasteurization.

BRIEF DESCRIPTION OF THE INVENTION

It has been discovered that whole eggs can be readily pasteurized and the bacteria count can be materially reduced by incorporating within the liquid whole eggs prior to pasteurization, a food grade bivalent metal ion material selected from calcium, zinc and mixtures thereof in an amount ranging from 0.075% to about 0.75% by weight of eggs. Thereafter, an amount from 0.20% to about 2.0% by weight of an alkali polyphosphate having from about 2 to about 40 phosphate units is added thereto and dissolved. Then, a sufficient amount of alkali material is added to adjust the pH of the whole eggs to about 8.5–9.5. Thereafter, the whole eggs are heated to a temperature of between 125 to 145° F. to pasteurize the eggs. This combination of additives with heat has sufficient power to materially reduce the number of Salmonellae within the whole eggs. Without the addition of the bivalent metal ion to the whole eggs, the whole eggs will coagulate, and become unacceptable when subjected to the pasteurization conditions described.

DETAILED DESCRIPTION OF THE INVENTION

In the practice of the preferred form of the present invention, whole eggs are first separated from the egg shell in a conventional manner and mixed together to form a homogeneous mixture. A bivalent metal ion is then dissolved within the eggs ranging in an amount between 0.075 to about 0.75% by weight of the eggs. The bivalent metal ion may be any food grade material, preferably, the bivalent metal ion material may be selected from the group consisting of calcium, zinc, and mixtures thereof. The bivalent metal ion can be added in the form of salts such as zinc chloride, calcium hydroxide, calcium chloride, calcium acetate and the like. After the bivalent metal ion material has been dissolved within the whole egg, an alkali polyphosphate material is added thereto. The alkali polyphosphate material usable with the present invention can have from 2 to about 40 phosphate units within the molecular structure. Specific alkali polyphosphates that can be used with the present invention are sodium tripolyphosphate, tetrasodium pyrophosphate, tetrapolyphosphate, sodium hexametaphosphate, sodium polyphosphate and mixtures thereof. The amount of alkali polyphosphate that is added to the liquid whole eggs may range between 0.20 to about 2.0% by weight of the eggs.

After the alkali polyphosphate material has been added to the whole egg whites and dissolved therein, an alkali material selected from the group consisting of sodium hydroxide, ammonium hydroxide, potassium hydroxide, calcium hydroxide, sodium phosphate, sodium carbonate, sodium bicarbonate, and mixtures thereof, is added to the liquid whole eggs to adjust the pH of the whole eggs to at least 0.5 to about 2.5 units above the natural pH of the liquid whole eggs.

After the above additives have been dissolved within the whole egg, the eggs are subjected to a temperature of between 125 to 145, preferably about 130° F., for a time between 0.5 and 10 minutes, preferably 3.5–5 minutes. The amount of time that the eggs are subjected to this heat will depend upon the pH that the eggs are raised to. Thereafter, the eggs are cooled, the pH adjusted to the original value and stored for use.

As an alternative process for practicing the present invention, it has been found that the alkali material can be used alone or in combination with bivalent metal ion without the addition of the alkali polyphosphate. In the event that sodium hydroxide is employed without the bivalent metal ion or alkali polyphosphate, care should be maintained not to exceed a pH of about 8.3. In the event that this pH is exceeded, and the material is heated under the conditions of pasteurization, the protein material within the whole eggs will precipitate and the functional properties will be materially altered, resulting in an unusuable or unsaleable egg product. However, in case the alkali material is used in combination with the bivalent metal ion material, the pH of 9.5 can be employed without materially altering the functional properties at the pasteurization temperatures. Also, it has been found that the alkali polyphosphate material can be used in combination with the bivalent metal ion material but without the alkali material to produce essentially the same pasteurization steps. However, the bivalent metal ion material must be added prior to the phosphate. In the event that the phosphate material is added to the whole eggs without the presence of the bivalent metal ion, the proteins will be materially altered and the functional properties of whole egg will be destroyed. Thus, it has been found that the use of the bivalent metal ion material admixed with the whole eggs in combination with either the sodium material or alkali polyphosphate or mixtures thereof, the pH can be materially increased and the Salmonellae within the eggs can be killed with increased efficiency.

In order to illustrate the merits of the invention, the following examples are provided:

Example 1

Fresh eggs were separated from the shells in a hand operation and mixed together to form a uniform batch. A bacterial culture of *Salmonellae senftenberg* 775 was added to the liquid whole eggs to provide a concentration thereof at 26,000 per milliliter. Then, 5.0 grams of calcium chloride was added per liter of liquid whole eggs, followed by the addition of 5 grams of sodium hexametaphosphate per liter. These additives were dissolved in liquid whole eggs. Thereafter, a 10% solution of sodium hydroxide was added dropwise until the pH of the liquid whole eggs was raised to 9.0. The liquid whole eggs were then pasteurized at a temperature of 130° F. for a holding time of 5 minutes and then quickly cooled to 38° F. An assay of the liquid whole eggs using standard microbiological procedures indicated the sample to be Salmonellae negative.

Example 2

The procedure as set forth in Example 1 was repeated in its entirety except no additives were dissolved within the eggs. An assay of the pasteurized liquid whole eggs using standard microbiological procedures indicated a survival of 7600 Salmonellae per milliliter.

Example 3

Fresh eggs were obtained in a similar manner as set forth in Example 1. The liquid whole eggs were contaminated with a pure culture of *Salmonellae senftenberg* 775. The liquid whole eggs were then kept standing at 98° F. for 24 hours. During this time the Salmonellae that were introduced into the whole eggs multiplied. A microbiological count was made indicating a concentration of the *Salmonellae senftenberg* 775 in the whole egg at 28,500 per milliliter. Then, calcium chloride was added to the liquid whole eggs to provide a concentration thereof of 0.5% by weight. Then, sodium hexametaphosphate in an amount of 0.5% by weight was dissolved therein. Thereafter, a 10% solution of sodium hydroxide was added thereto in a dropwise manner to provide a pH of 9.0. Then, the liquid whole eggs were exposed to pasteurization temperatures of 141° F. for a holding time of 3.5 minutes and then cooled quickly to 40° F. An assay of the pasteurized liquid whole eggs using standard microbiological procedures indicated the sample to be Salmonellae negative.

Example 4

The procedure as set forth in Example 3 was repeated in its entirety except no additives were dissolved within the liquid whole eggs. An assay of the pasteurized liquid whole eggs indicated a survival of 660 Salmonellae per milliliter.

Example 5

A batch of fresh liquid whole eggs were obtained in a similar manner as set forth in Example 1. The liquid whole eggs were contaminated with a pure culture of *Salmonellae typhimurium*. The liquid whole eggs were then kept standing at 98° F. for 24 hours. During this time the Salmonellae that were introduced into the whole eggs multiplied. A microbiological count was made indicating a concentration of the *Salmonellae typhimurium* in the whole eggs at 140,000 per milliliter. Then, calcium chloride was added to the liquid whole eggs to provide a concentration thereof of 0.75% by weight. Then, sodium hexametaphosphate in an amount of 0.75% by weight was dissolved therein. Thereafter, a 15% solution of ammonium hydroxide was added thereto in a dropwise manner to provide a pH of 8.8. Then, the liquid whole eggs were exposed to a pasteurization temperature of 135° F. for a holding time of 5 minutes and then cooled quickly to 40° F. An assay of the pasteurized liquid whole eggs using standard microbiological procedures indicated the sample to be Salmonellae negative.

Example 6

Fresh eggs were separated from the shells in a manner as set forth in Example 1. Bacterial culture of *Salmonellae typhimurium* was added to the liquid whole eggs to provide a concentration thereof at 175,000 per milliliter. Then, calcium chloride was added thereto to provide a concentration thereof at 1.0%, followed by dropwise addition of a 15% solution of ammonium hydroxide until the pH of the whole eggs was raised to 9.2. Thereafter, the liquid whole eggs were pasteurized at a temperature of 130° F. for a holding time of five minutes and then quickly cooled. An assay of the liquid whole eggs using standard microbiological procedures indicated the sample to be Salmonellae negative.

Example 7

Fresh eggs were obtained in a similar manner as set forth in Example 1. The liquid whole eggs were contaminated with a pure culture of *Salmonellae typhimurium*. The eggs were then kept standing at 98° F. for 24 hours. During this time the Salmonellae that were introduced into the liquid whole eggs multiplied. A microbiological count was made indicating a concentation of the *Salmonellae typhimurium* in the whole eggs at 92,000 per milliliter. Then, calcium chloride was added to the liquid whole eggs to provide a concentration thereof of 1.0%, followed by dropwise addition of a 10% solution of sodium hydroxide until the pH of the eggs was 8.3. The liquid whole eggs were exposed to a pasteurization temperature of 133° F. for a holding time of five minutes and then cooled quickly to 42° F. A microbiological assay of the pasteurized eggs revealed that the sample was Salmonellae negative.

Example 8

Refrigerated whole eggs having a pH of 7.2 were dispersed by a mechanical method to produce a fluid of essentially a uniform consistency prior to pasteurization. To the eggs treated in this manner, several different additives were dissolved therein. The eggs were then pasteurized at a temperature of 130° F. for five minutes holding time. The eggs were then cooled quickly in an ice bath. The eggs were then evaluated for possible signs of protein denaturization by noting changes in the egg color, and by baking tests after the pH was adjusted to the original value with a 10% solution of phosphoric acid. The baking performance of the pasteurized eggs was evaluated in a sponge cake formula prepared in the following manner:

168 grams of liquid whole eggs were mixed in a kitchen style mixer at No. 8 speed for two minutes. A blend of 0.75 grams salt and 0.75 grams of cream of tartar was then added to the above mixture and mixed for an additional 1 minute at No. 8 speed. Then, 75 grams of granulated sugar was added. The eggs were then mixed for two additional minutes at No. 8 speed. Thereafter, a mixture consisting of 64 grams of cake flour and 38 grams of granulated sugar were added thereto in 30 seconds while the batter was mixed slowly at No. 1 speed. The specific gravity of the batter was measured (grams of batter per milliliter), and the batter was then poured into six inch pans and baked at 355° F. for 30 minutes. The eggs were evaluated in the following manner:

(1) Egg color—yellow-orange color is acceptable, while brown with or without protein precipitation is undesirable.
(2) Specific gravity of batter—low levels indicate high air encapsulation during mixing, which is desirable for the preparation of high quality cakes.
(3) Cake volumes—measured by standard seed displacement.

The evaluation of the eggs pasteurized in the manner described above are given in the following table.

TABLE I

| Additives | pH | Color of eggs | Specific gravity of batter (gr./ml.) | Specific volume of cakes |
|---|---|---|---|---|
| Ammonium hydroxide | 9.0 | Brown | 0.42 | 5.0 |
| 0.5% sodium hexametaphosphate | 7.1 | Brown with a precipitate | 0.43 | 4.5 |
| (a) Ammonium hydroxide; (b) 0.5% sodium hexametaphosphate | 9.0 | do | 0.46 | 5.2 |
| (a) 0.5% calcium chloride; (b) ammonium hydroxide | 9.0 | Yellow | 0.37 | 5.8 |
| (a) 0.5% calcium chloride; (b) 0.5% sodium hexametaphosphate | 7.0 | do | 0.36 | 5.8 |
| (a) 0.5% calcium chloride; (b) 0.5% sodium hexametaphosphate; (c) ammonium hydroxide | 9.0 | do | 0.33 | 6.2 |
| Sodium hydroxide | 9.0 | Brown | 0.35 | 5.5 |
| (a) 0.5% calcium chloride; (b) sodium hydroxide | 9.0 | Yellow | 0.35 | 5.9 |
| (a) 0.5% sodium hexametaphosphate; (b) sodium hydroxide | 9.0 | Brown with precipitate | 0.46 | 5.0 |
| (a) 0.5% calcium chloride; (b) 0.5% sodium hexametaphosphate; (c) sodium hydroxide | 9 | Yellow | 0.35 | 6.0 |
| Control (no pasteurization) | 7.2 | do | 0.35 | 5.9 |
| Control (no additives and pasteurized at 142° F. for 3.5 minutes) | 7.2 | do | 0.30 | 6.1 |

What is claimed is:

1. The process of pasteurizing liquid whole eggs, comprising the steps of:
   (a) adding a food grade bivalent metal ion material selected from the group consisting of calcium, zinc and mixtures thereof, within said eggs;
   (b) adding a responsive amount of an alkali polyphosphate material thereto;
   (c) heating said eggs to a pasteurization temperature for a sufficient length of time to pasteurize them.

2. The process as set forth in claim 1, wherein said food grade bivalent metal ion material can be present in an amount ranging between 0.075 to about 0.75% by weight of the eggs.

3. The process as set forth in claim 1, wherein said alkali polyphosphate material can have between 2 to 40 units within the molecular structure and is present in an amount ranging between 0.20 and 2% by weight.

4. The process as set forth in claim 3, wherein said alkali polyphosphate materials may be selected from the group consisting of sodium tripolyphosphate, tetrasodium pyrophosphate, tetrapolyphosphate, sodium hexametaphosphate, sodium polyphosphate and mixtures thereof.

5. The process as set forth in claim 1, wherein said pasteurization temperature can range between 125 and 145° F.

6. The process as set forth in claim 1, wherein said pasteurization temperature is held for a period of from 0.5 to 10 minutes.

7. The process as set forth in claim 1, together with the additional step of adjusting the natural pH of said liquid eggs to about 0.5 to 2.5 units above the natural pH thereof with an alkali agent.

8. The process as set forth in claim 7, wherein said alkaline agent may be selected from the group consisting of sodium hydroxide, ammonium hydroxide, potassium hydroxide, calcium hydroxide, sodium phosphate, sodium carbonate, sodium bicarbonate, and mixtures thereof.

9. The process as set forth in claim 1, together with the additional steps of cooling said pasteurized liquid whole eggs.

10. The process as set forth in claim 7, together with the additional steps of cooling said pasteurized liquid whole eggs and adjusting the pH to its natural level with a food grade acid.

11. A process for pasteurizing liquid whole eggs comprising the steps of:
   (a) preparing a liquid whole egg composition for pasteurization wherein the liquid whole eggs have an adjusted pH of from 0.5 to 2.5 units above the natural pH thereof, said adjustment being done with a food grade alkali agent, and said composition also including a bivalent metal ion material selected from the group consisting of calcium, zinc and mixtures thereof, and
   (b) heating said liquid whole egg composition to a pasteurization temperature for a sufficient length of time to pasteurize said eggs.

12. The process as set forth in claim 11, wherein said bivalent metal ion material may be present in an amount ranging between 0.075 to about 0.75% by weight of the eggs.

13. The process as set forth in claim 11, together with the additional step of cooling said pasteurized liquid whole eggs.

14. The process as set forth in claim 11, together with additional steps of cooling said liquid whole eggs and adjusting the pH to its original level.

References Cited

UNITED STATES PATENTS 2,752,248   6/1956   Blick et al.   99—113

A. LOUIS MONACELL, Primary Examiner

W. BOVEE, Assistant Examiner

U.S. Cl. X.R.

99—113, 211, 215